United States Patent Office 3,560,432
Patented Feb. 2, 1971

3,560,432
STABILISATION OF POLYMERS
Peter James Briggs, Eric Samuel Nicholson, and Vijay Ratna Sharma, Manchester, England, assignors to Imperial Chemical Industries Limited, London, England, a corporation of Great Britain
No Drawing. Filed Mar. 14, 1968, Ser. No. 712,930
Claims priority, application Great Britain, Mar. 17, 1967, 12,565/67; Oct. 2, 1967, 44,779/67
Int. Cl. C08f 45/58, 45/60
U.S. Cl. 260—45.8                                10 Claims

ABSTRACT OF THE DISCLOSURE

Polymers, especially polyolefines, are stabilized particularly against heat and oxidation, by the addition of mono or bis-(3,5-dialkyl-4-hydroxybenzyl)amines in combination with a triaryl phosphite, cyclic phosphite or monoester of phosphorous acid.

---

This invention relates to a process for improving the stability of polymers to heat, light and oxidation.

According to the invention there is provided a process for the stabilisation of polymers which comprises incorporating into the polymer (a) a hydroxybenzylamine of the formula

wherein A represents a group of the formula

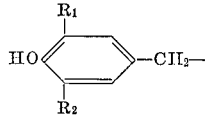

wherein $R_1$ and $R_2$, which may be the same or different, each represent an alkyl group containing from 1 to 12 carbon atoms or a cycloalkyl group containing from 5 to 8 carbon atoms, or an aralkyl group, $R_3$ represents a group A or $R_1$ or a hyroxyalkyl group containing from 1 to 12 carbon atoms or an aralkyl group or an alkaryl group and $R_4$ represents a group $R_3$ or a hydrogen atom or wherein $R_3$ and $R_4$ together with the nitrogen atom form a heterocyclic ring and (b) A triaryl phosphite wherein the aryl group may optionally be substituted by an alkyl, aryl, aralkyl, cycloalkyl, hydroxyl or chloro group or (c) A cyclic phosphite ester or (d) A monoester of phosphorous acid.

As polymers there may be mentioned for example natural and synthetic rubbers, polymers of diolefins, copolymers of diolefins with ethylenically unsaturated monomers, polymers of ethylenically unsaturated compounds such as a methyl methacrylate, vinyl chloride and acrylonitrile, particularly polyolefines such as polyethylene, polypropylene, poly-4-methylpentene-1 and copolymers of these with other olefines, copolymers of acrylonitrile/styrene and of acrylonitrile/butadiene/styrene, polyamides such as polyhexamethylene adipamide, polyesters such as polyethylene terephthalate, polyurethanes and polyethers.

As groups which may be represented by $R_1$ and $R_2$ there may be mentioned for example methyl, ethyl, isopropyl, tert.-butyl, tert.-octyl, butyl, sec.-butyl, nonyl, dodecyl, cyclopentyl, cyclohexyl, α-methylstyryl or α-methylcyclohexyl groups. It is preferred that either $R_1$ or $R_1$ and $R_2$ are branched at the α-carbon atom, and preferably each contains from 4 to 8 carbon atoms, as for example in tert.-butyl and tert.-octyl groups.

As hydroxyalkyl groups which may be represented by $R_3$ there may be mentioned for example β-hydroxyethyl, γ-hydroxypropyl and β-hydroxypropyl.

As aralkyl groups which may be represented by $R_3$ there may be mentioned for example benzyl, and as alkaryl groups which may be represented by $R_3$ there may be mentioned nonylphenyl and dodecylphenyl.

As heterocyclic rings which may be formed by $R_3$ and $R_4$ together with the nitrogen atom there may be mentioned for example morpholine, piperidine and piperazine in which the second nitrogen atom may carry as substituent a group A.

It is preferred that $R_3$ is either a hydroxyalkyl group or, particularly preferred, a group of the formula represented by A, and that $R_4$ is either an alkyl group containing from 1 to 3 carbon atoms or, particularly preferred, a hydroxyalkyl group, especially β-hydroxyethyl.

As triaryl phosphites there may be mentioned for example triphenyl phosphite, tris-p-nonylphenyl phosphite and tris(3,5-di-tert.-butyl-4-hydroxyphenyl) phosphite.

As cyclic phosphite esters there are meant esters of phosphorous acid with an alcohol or phenol in which the phosphorus atom together with two of the oxygen atoms and some of the atoms from the alcohol or phenol form a ring.

As monoesters of phosphorous acid there are meant compounds (also known as for example phosphonic acids or alkyl hydrogen phosphonates) of the formula:

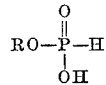

wherein R represents an alkyl, alkenyl, cycloalkyl, aryl or aralkyl group or substituted derivatives of these, and especially wherein R represents a 2,2-di(hydroxymethyl) alkyl group or a substituted derivative thereof.

The hydroxybenzylamine and triaryl phosphite, cyclic phosphite or phosphorous acid monoester may be incorporated into the polymer as a mixture or individually at the same time or in succession by any conventional procedure; for example by mixing the stabilising compounds with the polymer in powder form followed by milling, if necessary at elevated temperature; by adding to stabilising compounds in solution in a volatile solvent or solvents to the polymer powder and evaporating the solvent; or by extrusion compounding.

Suitable amounts of the hydroxybenzylamines are from 0.001% to 5% of the weight of polymer or copolymer, but it is preferred to use at least 0.001% and particularly at least 0.005%, and preferably not more than 0.05%.

Suitable amounts of the triarylphosphite, cyclic phosphite ester or monoester of phosphorous acid are from 0.001 to 5%, and preferably from 0.005 or more particularly from 0.05 to 1.0%, of the weight of the polymer.

The effect of the combination of stabilising compounds used in the process of the invention is enhanced in many cases by the incorporation also into the polymer of sulphides such as dilauryl or dioctadecyl. Thiodipropionates or thiodibutyrates, bis(2 - hydroxy - 5 - methylbenzyl) sulphide, bis(3 - tert.-butyl-2-hydroxy-5-methoxybenzyl) sulphide, 2,2' - dihydroxy-5,5'-dimethyldiphenylsulphide, metal dialkyl dithiophosphates, metal dialkyldithiocarbamates, trialkyltrithiophosphites, or phenols such as 2,6-ditert.-butyl - 4 - methylphenol, 4,4' - thiobis(3-methyl-6-tert. - butylphenol, 1,1,3 - tris(5 - tert. - butyl - 4 - hydroxy - 2 - methylphenyl)butane, 1,1,5,5 - tetrakis(5 - tert. - butyl - 4 - hydroxy - 2 - methylphenyl)pentane, pentaerythrityl - β - (4 - hydroxy - 3,5 - di - tert. - butylphenyl)propionate, 1,1,5,5 - tetrakis(3 - methyl - 4 - hydroxy - 5 - tert. - butylphenylpentane, 1,3,5 - trimethyl- 2,4,6 - tris(3',5' - ditert. - butyl - 4 - hydroxybenzyl)benzene, octadecyl ester of β-3,5-ditert.-butyl-4-hydroxyphenylpropionic acid, trimethylolpropane ester of β-3,5-di-tert.-butyl-4-hydroxyphenylpropionic acid and phenol/aldehyde condensates.

Suitable amounts of these sulphides or phenols are from 0.05 to 5%, and preferably from 0.1 to 0.5%, of the weight of polymer.

Other conventional additives may also be present in the polymer including other stabilisers, antioxidants, cross-linking agents, blowing agents, plasticisers, fillers, slip agents, anti-static agents, pigments, U.V. absorbing agents, such as 2 - hydroxybenzophenones, 2 - hydroxyphenyl benztriazoles, nickel complexes of compounds such as dialkyldithiocarbamates, bisphenol sulphides, and 2-hydroxyphenyl ketoximes, and metal soaps.

By the process of the invention effective protection is afforded against degradation or discoloration caused by heat, light or oxidation. Especially good protection is obtained by using the hydroxybenzylamine in combination with a monoester of phosphorous acid. In particular for example polypropylene is protected against oxidation, especially oxidation catalysed by metal such as copper or cobalt ions. Higher melting polyolefines such as the stereoregular polymers obtained from branched chain α-olefins containing at least 5 carbon atoms such as 4-methylpentene-1,3-methylbutene-1 and 3-methylpentene-1 by for example the use of catalysts derived from a reducing metal, metal alkyl or metal alkyl halide by reaction with a transition metal compound are stabilised against thermal degradation during melting and extrusion or otherwise shaping without causing discoloration or photosensitisation.

The invention is illustrated but not limited by the following examples in which all parts and percentages are by weight unless otherwise stated.

EXAMPLE 1

Stabilisers as listed in the table below are dissolved in 5 parts of ethyl alcohol and 45 parts of trichlorotrifluoroethane and the solution is stirred at 50° C. Powdered copolymer of 98% 4-methylpentene-1 and 2% of n-decene (prepared by the method of Specification No. 1,001,801) is then added and the mixture stirred until all the solvent has been removed.

Homogenisation of the above mix so obtained is carried out in an electrically heated platen press at 60° C. with separate pressings of 1 minute duration each. The mixes are then tested in a melt grader at 280° C. using a 2 kgm. weight on the piston and a substandard die and the weight of polymer extruded in one minute is determined at regular intervals for 20 minutes. A higher figure indicates poor melt stability and vice versa.

listed in the table below are dissolved in 5 parts of ethanol and diluted with 45 parts of trichlorotrifluoethane. This mixture is poured over 100 parts of a copolymer of 98% 4-methylpentene-1 and 2% of n-decene-1 in the form of a fine powder under constant stirring at a temperature of 50° C. until all the solvent is driven off. The powder is then extruded on a ¾" extruder using a nylon-type screw with 20:1 L/D ratio at 40 r.p.m. Zone temperatures along the barrel are 188° C., 245° C., 266° C., 270° C. and 282° C. (at the die). The polymer is extruded through a ³⁄₂₂" rod die with 60° cone entry, passed through a cooling bath at about 25° C., and the lace wound up. After lace-cutting, the granules are injection moulded on a 1-ounce reciprocating screw machine. Operating temperatures along the barrel are 255° C., 265° C. and 275° C. (at the nozzle). The mould temperature is 70° C. and a ²⁵⁄₁₅ seconds injection/cooling cycle is used. The injection pressure is 25 kg. per sq. cm. The 3-impression mould produces a 2"×⅛" plaque.

The melt flow of the lace (extrudate) and of the injection moulding is determined by ASTM method 9238–62T modified in that a 5 kg. weight is used instead of that specified for causing extrusion and that the temperature of the polymer is maintained at 260° C.

The colour imparted to the polymer is assessed by calculating the "yellow factor" of each plaque. The percentage of light transmitted through the plaque and blue, green and red filters respectively is measured using a Colourmaster, the "yellow factor" being then calculated by the formula:

Yellow factor =
$$\frac{\text{percent transmission (red)} - \text{percent transmission (blue)}}{\text{percent transmission (green)}} \times 100$$

| N,N-di(3,5-ditert.)-butyl-4-hydroxybenzyl)ethanol-amine | Melt flow extruded lace | Index plaque | Yellow factor |
|---|---|---|---|
| None | 32 | 80 | 12.7 |
| 0.001 | 11 | 35 | 7.0 |
| 0.002 | 12 | 22 | 5.1 |
| 0.005 | 8.5 | 17.5 | 6.2 |
| 0.0075 | 9.5 | 16 | 6.1 |

EXAMPLE 3

A stabilised powder is prepared as described in Example 2 except that instead of using the amounts listed of 2,2-di(hydroxymethyl) butyl ester of phosphorous acid and of N,N-di(3,5-ditert.-butyl-4-hydroxybenzyl) ethanolamine there was used a mixture of these components containing 92% of the first and 8% of the second. This powder mixture is moulded in an electrically heated platen press at 260° C. for 1 minute to give a sheet about 2 mm. thick. The sheet is cooled and cut up into small

| Stabiliser composition | Colour of extrudate | Rate of extrusion per minute (gm.× 10²) after heating in the grader for— | | | |
|---|---|---|---|---|---|
| | | 5 min. | 10 min. | 15 min. | 20 min. |
| 0.25% of antioxidant sold under the trade name Irganox 1010 (Irganox is a Registered Trade Mark) and 0.1% of N,N-di-(3,5-di-t-butyl-4-hydroxybenzyl)ethanolamine. | Yellow-brown | 1.28 | 1.60 | 2.08 | 2.40 |
| 0.25% of Irganox 1010 and 0.1% of triphenylphosphite | Colourless | 3.76 | 4.38 | 4.65 | 5.05 |
| 0.25% of Irganox 1010, 0.1% of N,N-di(3,5-di-t-butyl-4-hydroxybenzyl)ethanolamine and 0.09% of triphenylphosphite. | do | 1.90 | 2.00 | 2.10 | 2.10 |
| 0.25% of Irganox 1010, 0.015% of N,N-di(3,5-di-t-butyl-4-hydroxybenzyl)ethanolamine and 0.5% of triphenylphosphite. | do | 1.75 | 1.80 | 1.80 | 1.85 |
| cf. 0.25% of Irganox 1010 and 0.25% of 2,6-di-t-butyl-4-methylphenol (commercial stabiliser) | do | 2.3 | 3.3 | 8.5 | 25 |
| 0.25% of Irganox 1010 and 0.1% of trimethylolpropane phosphite | do | 2.45 | 2.90 | 3.10 | 3.30 |
| 0.25% of Irganox 1010, 0.15% of N,N-di(3,5-di-t-butyl-4-hydroxybenzyl)ethanolamine and 0.85% trimethylolpropane phosphite. | do | 1.50 | 1.62 | 1.62 | 1.62 |

EXAMPLE 2

0.1 part of the commercial antioxidant sold under the name Irganox 1010, 0.25 part of dilauryl thiodiproprionate, 0.1 part of 2,2-dihydroxymethylbutyl ester of phosphorous acid (2,2-dihydroxymethylbutyl phosphonic acid) (except in the control sample in which this additive as well as the N,N-di(3,5-ditert.-butyl-4-hydroxybenzyl)ethanolamine is omitted) and N,N-di(3,5-di-tert.-butyl-4-hydroxybenzyl)ethanolamine in the amounts pieces. These pieces are remoulded at 260° C. and the resulting sheet once more similarly cut up. The process of moulding and cutting is done three times to ensure a uniform distribution of the additives. Finally, the cut pieces are tested in a melt flow grader at a temperature of 280° C., using a 2 kg. load and a sub-standard die. After an initial period of heating without the load, the load is put on and the amount of material in grammes extruded is determined at 1 minute intervals.

Results

Weights extruded ×100 in grammes in 60 seconds at 280° C.

| Time (mins.) | Amount of stabiliser mixture | | | | | | |
|---|---|---|---|---|---|---|---|
| | None | 0.001 | 0.002 | 0.005 | 0.01 | 0.05 | 01 |
| 1 | 2.80 | 2.60 | 2.66 | 2.80 | 2.08 | 2.02 | 1.54 |
| 2 | 3.10 | 2.85 | 2.98 | 2.94 | 2.20 | 2.16 | 1.55 |
| 3 | 3.85 | 3.25 | 3.22 | 3.30 | 2.46 | 2.32 | 1.56 |
| 4 | 4.60 | 3.95 | 3.64 | 3.50 | 2.90 | 2.41 | 1.65 |
| 5 | 6.10 | 4.95 | 4.54 | 3.96 | 3.47 | 2.53 | 1.71 |

EXAMPLE 4

(a) 100 g. of pale crepe natural rubber are milled for 5 minutes on a laboratory 2-roll mixing mill at a temperature of 70° C. The resulting sheet is cut off and pressed in a steam heated platen press at 140° C. for 3 minutes and cooled under pressure. Oxygen absorption measurements are carried out by a manometric method at 100° C. and time to absorb 0.5%, 1.0% and 1.5% oxygen by weight are determined.

(b) The work is repeated but 0.5 g. of a 10% solution of N,N - di(3,5 - ditert.-butyl-4-hydroxybenzyl)ethanolamine in 2,2-di(hydroxymethyl)butyl monoester of phosphorous acid, was incorporated into the rubber on the mill in the conventional manner. The results are as follows:

| Mix | Time to absorb oxygen at 100° C. (hrs.) | | |
|---|---|---|---|
| | 0.5% | 1.0% | 1.5% |
| Rubber only (a) | 4.75 | 6.5 | 9 |
| Rubber plus 0.5% additive mixture as described in (b) above | 30 | 35 | 37 |

EXAMPLE 5

Stabilisers as listed below are incorporated into polypropylene by the following procedure. The unstabilised polypropylene powder is placed in a vessel at 50° C. The other ingredients required for each mix are dissolved in a minimum quantity of ethanol or acetone and diluted with about 50 parts of trichlorotrifluoroethane. This solution is added with stirring to the polymer and the stirring continued until almost all the solvent has been driven off and a homogeneous mixture of the ingredients results. This compounded powder is pressed in a steam-heated platen press at 180° C. for 3 minutes, followed by cooling under pressure, to give test sheets of about 0.75 mm. thickness. These are aged in an air oven at 150° C. fitted with a circulating fan. The samples are examined daily for the development of crazing and onset of embrittlement, both visually and by gently flexing with the fingers. The embrittlement times are given below.

The moulded sheets are also examined visually and for light transmittance at a wavelength of 380 millimicrons as measured by a Hardy spectrometer.

| | | |
|---|---|---|
| Unstabilised polypropylene | 100 | 100 |
| 3-methyl-6-tert-butylphenol/crotonaldehyde condensate (commercial antioxidant) | 0.5 | 0.5 |
| 10% solution of N,N-di(3,5-ditert.-butyl-4-hydroxybenzyl)-ethanolamine in 2,2-di(hydroxymethyl)butyl monoester of phosphorous acid | | 0.5 |
| Oven hours for embrittlement | 146 | 239 |
| Appearance | (1) | (2) |
| Transmittance at 380 millimicrons, percent | 76 | 82 |

1 Light yellowish brown.
2 Colourless.

What we claim is:
1. A stabilized composition of a polymer or copolymer of a mono-olefine having incorporated therein (a) from 0.0001 to 5%, by weight of the polymer, or copolymer, of a hydroxybenzylamine of the formula:

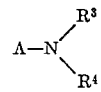

wherein A is a group of the formula:

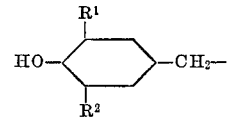

in which $R^1$ and $R^2$ are each alkyl groups containing from 1 to 12 carbon atoms or cycloalkyl groups containing from 5 to 8 carbon atoms, $R^3$ is a group A or an alkyl group containing from 1 to 12 carbon atoms, a hydroxyalkyl group containing from 2 to 3 carbon atoms or a cycloalkyl group containing from 5 to 8 carbon atoms and $R^4$ is a hydroxyalkyl group containing 2 to 3 carbon atoms or alternatively $R^3$ and $R^4$ together with the nitrogen atom form a heterocyclic ring selected from the group consisting of morpholine, piperidine and piperazine; and (b) from 0.001 to 5%, by weight of the polymer or copolymer, of phosphorous acid monoester of the formula:

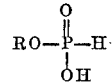

wherein R is a 2,2-di(hydroxymethyl) alkyl group.

2. A composition according to claim 1 wherein said polymer is polypropylene.

3. A composition according to claim 1 wherein a polymer or copolymer of 4-methylpentene-1.

4. A composition according to claim 1 wherein at least one of $R^1$ and $R^2$ are branched at the 9 carbon atom and contain from 4–8 carbon atoms.

5. A composition according to claim 1 wherein $R^3$ is a group of the formula represented by A.

6. A composition according to claim 1 wherein $R^4$ is hydroxyalkyl.

7. A composition according to claim 1 wherein the hydroxybenzylamine is used in amount from 0.005 to 0.05 of the weight of polymer or copolymer.

8. A composition according to claim 1 wherein the mono-ester of phosphorous acid is used in amount from 0.05 to 1.0% of the weight of polymer or copolymer.

9. A stabilized composition according to claim 1 which also includes a sulphide stabilizer selected from the group consisting of dilauryl and dioctadecyl thiodipropionates and thiodibutyrates, bis(2 - hydroxy - 5 - methylbenzyl)sulphide, bis(3 - tert.-butyl-2-hydroxy-5-methoxybenzyl)sulphide, 2,2' - dihydroxy-5,5' - dimethyldiphenylsulphide, metal dialkyl dithiophosphates, metal dialkyldithiocarbamates and trialkyltrithiophosphites.

10. A stabilized composition according to claim 1 which also includes a phenol stabilizer selected from the group consisting of 2,6-ditert. - butyl - 4 - methylphenol, 4,4'-thiobis(3-methyl - 6 - tert.-butylphenol, 1,1,3-tris(5-tert.-butyl - 4 - hydroxy-2-methylphenyl)butane, 1,1,5,5-tetrakis(5 - tert. - butyl-4 - hydroxy-2-methylphenyl)pentane, pentaerythrityl-β-(4-hydroxy - 3,5 - di-tert.-butylphenyl)-propionate, 1,1,5,5 - tetrakis(3 - methyl-4-hydroxy - 5-tert. - butylphenyl) pentane, 1,3,5 - trimethyl - 2,4,6-tris-(3',5' - ditert. - butyl-4-hydroxybenzyl)benzene, octadecyl ester of β-3,5 - ditert. - butyl-4-hydroxyphenylpropionic acid, trimethylol-propane ester of β-3,5-di - tert.-butyl-4-hydroxyphenylpropionic acid and phenol/aldehyde condensates.

(References on following page)

References Cited

UNITED STATES PATENTS

| | | | |
|---|---|---|---|
| 3,255,151 | 6/1966 | Hecker et al. | 260—45.9 |
| 3,305,483 | 2/1967 | Coffield | 260—45.9 |
| 3,342,767 | 9/1967 | Buckley | 260—45.9 |
| 3,349,110 | 10/1967 | Cyba | 260—45.9 |
| 3,467,735 | 9/1969 | Hunter | 260—45.9 |
| 3,396,131 | 8/1968 | MacMillan et al. | 260—45.9 |

OTHER REFERENCES

Scott, "Atmospheric Oxidation and Antioxidants," 1965 pp. 188–204.

HOSEA E. TAYLOR, Primary Examiner

U.S. Cl. X.R.

260—45.85, 45.9, 45.95